United States Patent
Tsuduki

(10) Patent No.: US 10,220,452 B2
(45) Date of Patent: Mar. 5, 2019

(54) FORMED ROTARY CUTTING TOOL

(71) Applicant: OSG CORPORATION, Toyokawa-shi, Aichi (JP)

(72) Inventor: Kiyoshi Tsuduki, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 81 days.

(21) Appl. No.: 15/500,851

(22) PCT Filed: Sep. 18, 2014

(86) PCT No.: PCT/JP2014/074746
§ 371 (c)(1),
(2) Date: Jan. 31, 2017

(87) PCT Pub. No.: WO2016/042646
PCT Pub. Date: Mar. 24, 2016

(65) Prior Publication Data
US 2017/0216938 A1    Aug. 3, 2017

(51) Int. Cl.
*B23C 5/10*     (2006.01)
*B23C 3/12*     (2006.01)
(Continued)

(52) U.S. Cl.
CPC ............... *B23C 5/14* (2013.01); *B23B 29/02* (2013.01); *B23B 29/025* (2013.01);
(Continued)

(58) Field of Classification Search
CPC .... B23C 5/10; B23C 5/12; B23C 5/18; B23C 5/1054; B23C 2210/242; B23C 2210/247;
(Continued)

(56) References Cited

U.S. PATENT DOCUMENTS 6,164,877 A * 12/2000 Kamata ..................... B23C 5/02
                                                                 407/61
2011/0129311 A1    6/2011 Itoh
2013/0251472 A1*  9/2013 Mori ......................... B23C 3/12
                                                                 409/132

FOREIGN PATENT DOCUMENTS

DE           19911927 A1    10/1999
JP       2008-279547 A      11/2008
(Continued)

OTHER PUBLICATIONS

Oct. 21, 2014 International Search Report issued in International Patent Application No. PCT/JP2014/074746.
(Continued)

*Primary Examiner* — Nicole N Ramos
(74) *Attorney, Agent, or Firm* — Oliff PLC

(57) ABSTRACT

A formed rotary cutting tool includes a cutting edge defining a cutting edge diameter that is increased and reduced in a direction of an axis of the tool, so as to have at least one neck portion in which the cutting edge diameter is minimized. The cutting tool includes a roughing portion which is provided on a periphery thereof and which is constituted by a succession of protrusions and recesses arranged in the direction of the axis. The roughing portion includes (i) a fine roughing portion that is provided in at least one of the at least one neck portion, and (ii) another portion that is provided in a portion that is other than the at least one of the at least one neck portion. The fine roughing portion of the roughing portion is different in characteristics from the above-described another portion of the roughing portion.

4 Claims, 9 Drawing Sheets

(51) Int. Cl.
*B23B 27/06* (2006.01)
*B23C 5/14* (2006.01)
*B23C 5/12* (2006.01)
*B23C 3/34* (2006.01)
*B23B 29/02* (2006.01)
*B23B 29/034* (2006.01)

(52) U.S. Cl.
CPC .......... *B23B 29/03432* (2013.01); *B23C 3/34* (2013.01); *B23C 5/10* (2013.01); *B23C 5/12* (2013.01); *B23B 27/06* (2013.01); *B23C 2210/088* (2013.01); *B23C 2210/242* (2013.01); *B23C 2215/52* (2013.01); *B23C 2220/366* (2013.01); *B23C 2220/60* (2013.01); *Y10T 407/1948* (2015.01); *Y10T 409/303808* (2015.01)

(58) Field of Classification Search
CPC ........ B23C 2210/285; B23C 2220/366; B23B 2215/44; B23B 2215/04; B23B 2215/76; B23B 2215/81
See application file for complete search history.

(56) References Cited

FOREIGN PATENT DOCUMENTS

JP    2008-307621 A    12/2008
JP    2010-158762 A    7/2010

OTHER PUBLICATIONS

Apr. 19, 2018 Extended European Search Report issued in European Patent Application No. 14902256.8.

* cited by examiner

UP-CUT SIDE — DOWN-CUT SIDE

FIG.11

| TOOL | | INVENTION PRODUCT | CONVENTIONAL PRODUCT |
|---|---|---|---|
| ROUGHING PITCH (FINE ROUGHING PITCH) | | 2.0 (1.0) | 2.0 |
| CUTTING CHIP FORM | | EXCELLENT | GOOD |
| VIBRATION | | EXCELLENT | GOOD |
| CUTTING NOISE | | GOOD | FAIR |
| FINISHED SURFACE | | GOOD | FAIR |
| MACHINE LOAD METER (%) | | 48 | 55 |
| TOOL DAMAGE | | NO DAMAGE | SOME CHIPPED |
| GROOVE INCLINATION(mm) | φ16 (FIRST VALLEY PORTION) | 0.15 | 0.35 |
| | φ36 (SECOND VALLEY PORTION) | 0.09 | 0.18 |
| GROOVE STRAIGHTNESS | | 0.07 | 0.2 |

FIG. 12

| TOOL | ROUGING PITCH | FINE ROUGING PITCH | CUTTING SHARPNESS | VIBRATION | CUTTING NOISE | FINISHED SURFACE | ROAD METER (%) | TOOL DAMAGE | GROOVE INCLINATION | GROOVE STRAIGHTNESS |
|---|---|---|---|---|---|---|---|---|---|---|
| INVENTION PRODUCT 1 | 2.0 | 0.4 | FAIR | GOOD | FAIR | GOOD | 53 | NO DAMAGE | 0.07 | 0.06 |
| INVENTION PRODUCT 2 | 2.0 | 0.5 | GOOD | GOOD | GOOD | GOOD | 50 | NO DAMAGE | 0.05 | 0.03 |
| INVENTION PRODUCT 3 | 2.0 | 1.0 | GOOD | EXCELLENT | GOOD | GOOD | 48 | NO DAMAGE | 0.04 | 0.03 |
| INVENTION PRODUCT 4 | 2.0 | 1.5 | GOOD | GOOD | GOOD | GOOD | 50 | NO DAMAGE | 0.05 | 0.03 |
| INVENTION PRODUCT 5 | 2.0 | 1.6 | FAIR | GOOD | FAIR | FAIR | 53 | SLIGHTLY CHIPPED | 0.08 | 0.07 |
| CONVENTION PRODUCT | 2.0 |  | FAIR | GOOD | FAIR | FAIR | 55 | CHIPPED | 0.10 | 0.10 |

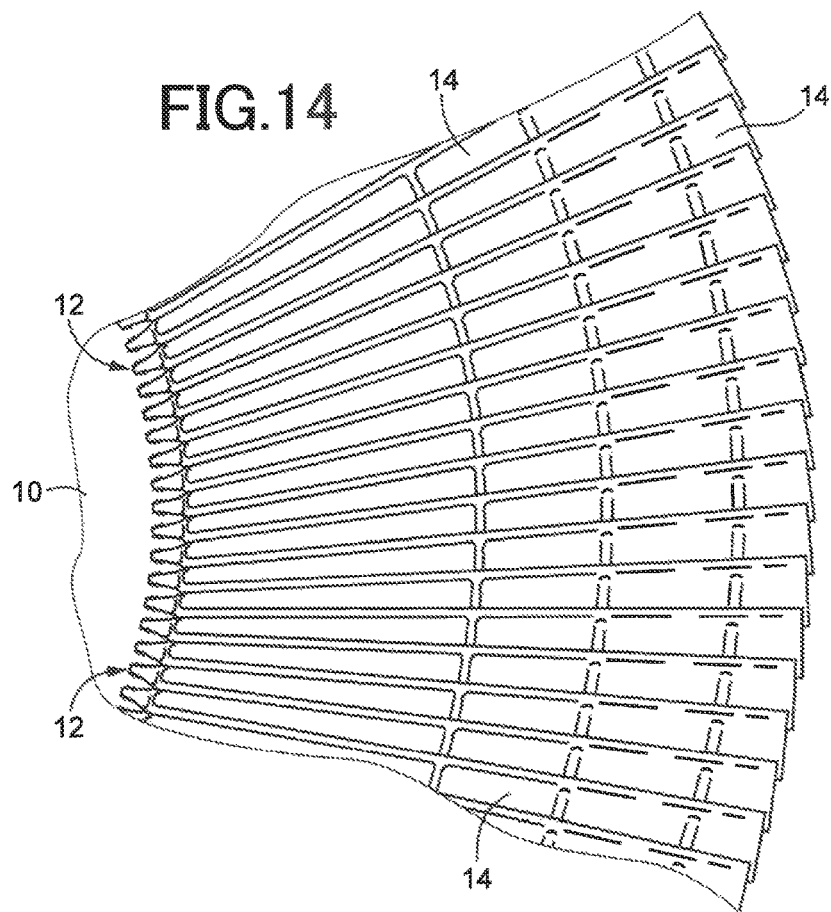
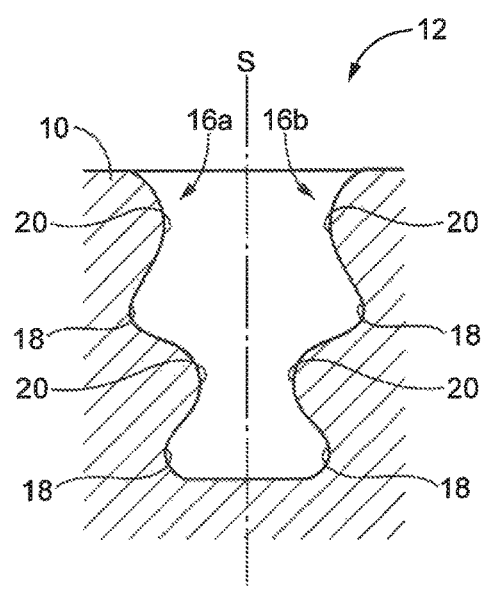

FORMED ROTARY CUTTING TOOL

TECHNICAL FIELD

The present invention relates to a formed rotary cutting tool, and more particularly to improvements for restraining occurrence of breakage.

BACKGROUND ART

As a structure for attaching turbine impeller such as steam turbine to a rotary shaft, there is a structure as shown in FIG. 14 in which a blade 14 of the turbine impeller is fitted in each of a multiplicity of tree-shaped grooves 12 that are provided in a periphery of the rotary shaft 10. FIG. 15 is a cross-sectional view showing one of the tree-shaped grooves 12 in enlargement. Each of the tree-shaped grooves 12 is symmetrical with respect to a groove center S. A width of the groove 12 is gradually increased and reduced, and generally reduced in a direction of groove depth (i.e., downward direction as seen in FIG. 15), like an inverted christmas-tree. In each of side surfaces 16a, 16b, a plurality of recessed portions 18 and a plurality of protruding portions 20 are provided to be alternately arranged.

There is proposed a tool for cutting the tree-shaped grooves 12 as shown in FIG. 15. A formed rotary cutting tool described in Patent Document 1 is an example of such a tool. According to this technique, a cutting edge diameter defined by cutting edges is increased and reduced, and is generally reduced in an axial direction toward a distal end of the tool. The formed rotary cutting tool is moved relative to a workpiece in a direction perpendicular to an axis of the cutting tool while being rotated about the axis, for cutting a groove having a predetermined shape, so that the inverted christmas-tree shaped groove 12 as shown in FIG. 15 can be cut in a simple and easy manner. Such a formed rotary cutting tool is called commonly as a christmas-tree cutter.

PRIOR ART DOCUMENT

Patent Document

[Patent Document 1] JP-2008-279547A

DISCLOSURE OF THE INVENTION

Object to be Achieved by the Invention

However, in the prior art technique, there was a risk of occurrence of breakage of the tool upon cutting of the groove. Particularly, the risk of breakage of the tool in a neck portion was high due to, for example, clogging of chips in the neck portion in which the cutting edge diameter is locally minimized. Thus, a formed rotary cutting tool capable of restraining occurrence of breakage has been expected to be developed.

The present invention was made in view of the background discussed above. It is therefore an object of the present invention to provide a formed rotary cutting tool capable of restraining occurrence of breakage.

Measures for Achieving the Object and Effect

To achieve the object, the essence of the first invention is a formed rotary cutting tool in which a cutting edge diameter of a cutting edge is increased and reduced in an axial direction toward a distal end of the tool, and a periphery is provided with a roughing portion constituted by a succession of protrusions and recesses arranged in the axial direction to have a corrugated shape, the formed rotary cutting tool being to be moved relative to a workpiece in a direction perpendicular to the axial direction while being rotated about an axis of the cutting tool, so as to cut a groove having a predetermined shape, the formed rotary cutting tool being characterized in that a neck portion in which the cutting edge diameter of the cutting edge is locally minimized is provided with a fine roughing portion that is different in characteristics from the roughing portion provided in a portion other than the neck portion.

Effect of the Invention

According to the above-described first invention, the neck portion in Which the cutting edge diameter of the cutting edge is locally minimized is provided with the fine roughing portion that is different in characteristics from the roughing portion provided in the portion other than the neck portion. For example, where the fine roughing portion provided in the neck portion has characteristics that make cutting chips small, it is possible to restrain clogging of the cutting chips in the neck portion and accordingly to advantageously restrain occurrence of breakage. That is, it is possible to provide a formed rotary cutting tool capable of restraining occurrence of the breakage.

The essence of the second invention depending from the first invention is that the fine roughing portion provided in the neck portion is smaller than the roughing portion provided in the portion other than the neck portion, in terms of a pitch of the protrusions and recesses. This arrangement makes it possible to restrain clogging of the cutting chips in the neck portion and accordingly to advantageously restrain occurrence of breakage, where the fine roughing portion provided in the neck portion has characteristics that make cutting chips smaller than in the portion other than the neck portion.

The essence of the third invention depending from the second invention is that the pitch of the protrusions and recesses in the roughing portion provided in the portion other than the neck portion is in a range between 0.5 mm and 5.0 mm, and the pitch of the protrusions and recesses in the fine roughing portion provided in the neck portion is in a range between 0.25 times and 0.75 times of the pitch of the protrusions and recesses in the roughing portion provided in the portions other than the neck portion. This arrangement makes it possible to restrain clogging of the cutting chips in the neck portion and accordingly to advantageously restrain occurrence of breakage, where the fine roughing portion provided in the neck portion has a practical construction that makes the cutting chips smaller than in the portion other than the neck portion.

The essence of the fourth invention depending from any one of the first through third inventions is that the fine roughing portion provided in the neck portion is smaller than the roughing portion provided in the portion other than the neck portion, in terms of a depth of the protrusions and recesses. This arrangement makes it possible to restrain clogging of the cutting chips in the neck portion and accordingly to advantageously restrain occurrence of breakage, where the fine roughing portion provided in the neck portion has characteristics that make cutting chips smaller than in the portion other than the neck portion.

The essence of the fifth invention depending from any one of the first through fourth inventions is that the fine roughing portion provided in the neck portion is smaller than the roughing portion provided in the portion other than the neck portion, in terms of a radius of curvature of the protrusions and recesses. This arrangement makes it possible to restrain clogging of the cutting chips in the neck portion and accordingly to advantageously restrain occurrence of breakage, where the fine roughing portion provided in the neck portion has characteristics that make cutting chips smaller than in the portion other than the neck portion.

The essence of the sixth invention depending from any one of the first through fifth inventions is that the neck portion in which the cutting edge diameter of the cutting edge is globally minimized is provided with the fine roughing portion that is different in characteristics from the roughing portion provided in the portion other than the neck portion. This arrangement makes it possible to restrain clogging of the cutting chips in the neck portion in which the cutting edge diameter of the cutting edge is globally minimized whereby the breakage is likely to occur the most, and accordingly to advantageously restrain occurrence of breakage in the neck portion.

The essence of the seventh invention depending from any one of the first through sixth inventions is that a roughing portion that is different in characteristics from the roughing portion and the fine roughing portion is provided between the neck portion and the roughing portion that is different in characteristics from the fine roughing portion. This arrangement makes it possible to further advantageously restrain clogging of the cutting chips in the neck portion, where the roughing portion provided between the fine rouging portion provided in the neck portion and the above-described roughing portion provided in the portion other than the neck portion has characteristics intermediate therebetween.

BRIEF DESCRIPTION OF DRAWINGS

FIG. 11 shows specifications of portions of tests tools used in a test conducted by the inventor for verifying effects of the invention and also result of the test.

FIG. 12 shows specifications of portions of tests tools used in a test conducted by the inventor for verifying effects of the invention and also result of the test.

FIG. 14 is a view showing a multiplicity of tree-shaped grooves in Which blades of a turbine impeller are attached.

FIG. 15 is a cross sectional view showing, in enlargement, the tree-shaped groove of FIG. 14.

MODES FOR CARRYING OUT THE INVENTION

Figure 1:
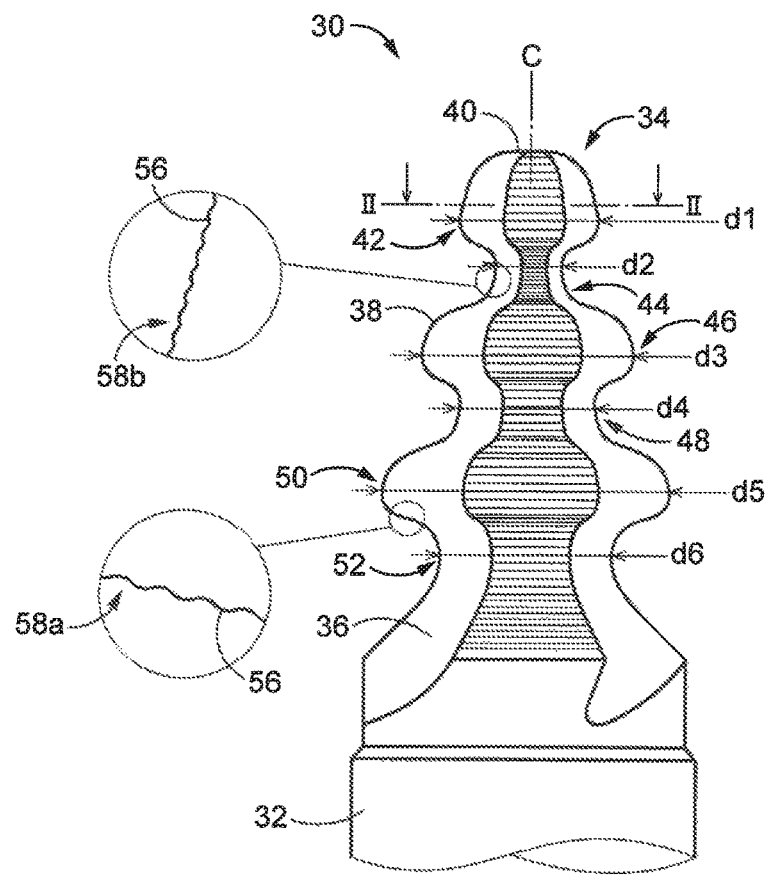
FIG. 1 is a front view showing an appearance of a christmas-tree cutter as a preferred embodiment of the present invention, as seen in a direction perpendicular to an axis of the cutter.

An embodiment of the present invention will now be described in detail with reference to the drawings. In the drawings used in the following description, portions are not necessarily precisely depicted, for example, in terms of dimension ratio.

EMBODIMENT

Figure 2:
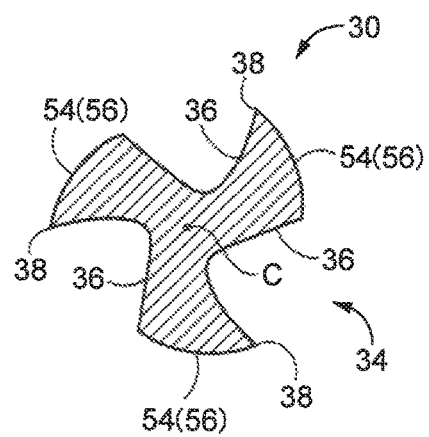
FIG. 2 is a cross sectional view taken along line II-II of FIG. 1.
Figure 3:
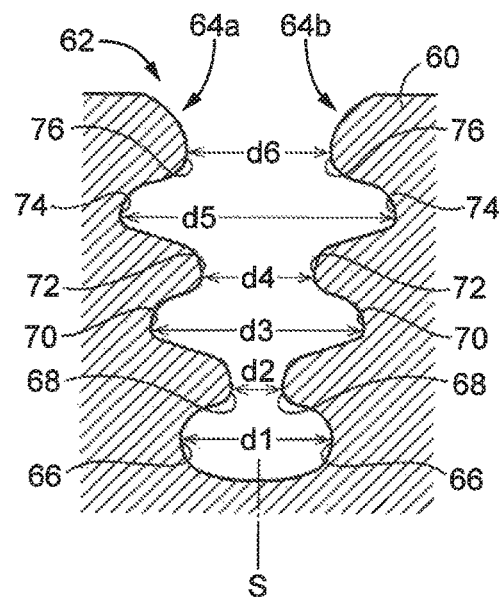
FIG. 3 is a cross sectional view showing a tree-shaped groove as an example of a groove that is to be cut in a workpiece by the christmas-tree cutter of FIG. 1.

FIG. 1 is a front view showing an appearance of a christmas-tree cutter 30 as an embodiment of a formed rotary cutting tool according to the present invention, as seen in a direction perpendicular to an axis of the cutter. FIG. 2 is a cross sectional view taken along line II-II of FIG. 1. The christmas-tree cutter 30 of the present embodiment is a formed rotary cutting tool (formed endmill) used to cut a tree-shaped groove 62 that is described later with reference to FIG. 3. The christmas-tree cutter 30 is attached at its shank portion 32 to a drive shaft of a cutting machine (not shown), so that the cutter 30 moved by the machine relative to a workpiece (workpiece 60 in an example shown in FIG. 3) in a direction perpendicular to its axis C while being rotated by the machine about the axis C, for thereby cutting a groove in the form of the tree-shaped groove 62 as shown in FIG. 3.

As shown in FIG. 1, the christmas-tree cutter 30 includes the above-described shank portion 32 and a blade portion 34 that are integral with each other. The blade portion 34 has an inverted christmas tree shape that corresponds to a protrusion and recess shape of the tree-shaped groove 62 described later with reference to FIG. 3. That is, the blade portion 34 is constructed to have a diameter which is gradually increased and reduced, and which is generally reduced in a direction of the axis C toward a distal end of the tool (in an upward direction as seen in FIG. 1). The blade portion 34 has a plurality of chip evacuation flutes 36 which are equiangularly arranged about the axis C and which extend in the direction of the axis C. The blade portion 34 further has a plurality of peripheral cutting edges 38 extending along the respective chip evacuation flutes 36 and a plurality of end cutting edges 40 contiguous to the respective peripheral cutting edges 38. Preferably, the chip evacuation flutes 36 consist of three chip evacuation flutes 36 that are equiangularly arranged about the axis C, and the peripheral cutting edges 38 consist of three peripheral cutting edges 38 that extend along the respective three chip evacuation flutes 36. The peripheral cutting edges 38 and end cutting edges 40 serve as cutting edges for cutting works as the christmas-tree cutter 30 is rotated in clockwise direction as seen from the side of the shank portion 32. Each of the chip evacuation flutes 36 is right-hand helical flute that twists by a predetermined helix angle.

As shown in FIG. 1, the blade portion 34 has a first mountain portion (first large-diameter portion) 42, a first valley portion (first small-diameter portion) 44, a second mountain portion (second large-diameter portion) 46, a second valley portion (second small-diameter portion) 48, a third mountain portion (third large-diameter portion) 50 and a third valley portion (third small-diameter portion) 52 that are formed to be arranged in this order of description as seen in a direction away from the tool distal end toward the shank portion 32. In FIG. 1, a diameter of the first mountain portion 42 is indicated by reference "d1", a diameter of the first valley portion 44 is indicated by reference "d2", a diameter of the second mountain portion 46 is indicated by reference "d3", a diameter of the second valley portion 48 is indicated by reference "d4", a diameter of the third mountain portion 50 is indicated by reference "d5", and a diameter of the third valley portion 52 is indicated by reference "d6". As described above, the blade portion 34 of the christmas-tree cutter 30 is constructed such that the diameter is gradually increased and reduced and such that the diameter is generally reduced in the direction toward the tool distal end. Therefore, the diameter of the first mountain portion. 42 is smaller than the diameter of the second mountain portion 46 that is smaller than the diameter of the third mountain portion 50. The diameter of the first valley portion 44 is smaller than the diameter of the second valley portion 48 that is smaller than the diameter of the third valley portion 52. That is, there are established relationships represented by d1<d3<d5 and d2<d4<d6, in terms of the dimensions shown in FIG. 1.

In the blade portion 34, the above-described diameters d1, d3 and d5 correspond to local maximum values of the diameter in the respective first mountain portion 42, second mountain portion 46 and third mountain portion 50, and the above-described diameters d2, d4 and d6 correspond to local minimum values of the diameter in the respective first valley portion 44, second valley portion 48 and third valley portion 52. In other words, the above-described diameters d1-d6 correspond to diameters of respective local maximum or minimum portions of the blade portion 34 whose diameter is gradually increased and reduced and is generally reduced in the direction toward the tool distal end. The local maximum or minimum portions means portions in which the diameter (or radius) as measured in a radial direction of the brake portion 34 is locally maximized or minimized in the respective first, second, third mountain portions 42, 46, 50 and first, second, third valley portions 44, 48, 52. In the christmas-tree cutter 30 of the present embodiment, each of the first, second and third valley portions 44, 48, 52 corresponds to a neck portion in which the cutting diameter defined by the peripheral cutting edges 38 is locally minimized.

FIG. 3 is a cross sectional view showing the tree-shaped groove 62 as an example of a groove (formed groove) that is to be cut in the workpiece 60 by the christmas-tree cutter 30. As shown in FIG. 3, in the tree-shaped groove 62 that is cut to be formed in the workpiece 60 by moving the christmas-tree cutter 30 relative to the workpiece 60 in a direction perpendicular to the axis C and rotating the christmas-tree cutter 30 about the axis C, the groove width is gradually increased and reduced and is generally reduced in the groove depth direction (the downward direction as seen in FIG. 3) such that the groove 62 is symmetrical with respect to the groove center S and has an inverted christmas tree like shape. That is, in each of opposite side surfaces 64a, 64b (hereinafter simply referred to as "side surfaces 64" unless they are to be distinguished from each other) of the tree-shaped groove 62, a first recessed portion 66, a first protruding portion 68, a second recessed portion 70, a second protruding portion 72, a third recessed portion 74 and a third protruding portion 76 are provided to be successively arranged in this order of description as seen in a direction away from a bottom of the groove 62 toward an opening of the groove 62. In FIG. 3, a width between of the first recessed portions 66 of the respective side surfaces 64a, 64b is indicated by reference sign "d1", a width between of the first protruding portions 68 of the respective side surfaces 64a, 64b is indicated by reference sign "d2", a width between of the second recessed portions 70 of the respective side surfaces 64a, 64b is indicated by reference sign "d3", a width between of the second protruding portions 72 of the respective side surfaces 64a, 64b is indicated by reference sign "d4", a width between of the third recessed portions 74 of the respective side surfaces 64a, 64b is indicated by reference sign "d5", and a width between of the third protruding portions 76 of the respective side surfaces 64a, 64b is indicated by reference sign "d6".

As shown in FIG. 1 and FIG. 3, the tree-shaped groove 62, which is cut in the workpiece 60 by the christmas-tree cutter 30, has a cross section whose shape corresponds to a shape of a cross section of the blade portion 34 of the christmas-tree cutter 30, wherein the cross section of the blade portion 34 contains the axis C. That is, the first recessed portions 66 in the respective side surfaces 64 of the tree-shaped groove 62 are formed to correspond to the first mountain portion 42 of the blade portion 34. The first protruding portions 68 in the respective side surfaces 64 of the tree-shaped groove 62 are formed to correspond to the first valley portion 44. The second recessed portions 70 in the respective side surfaces 64 of the tree-shaped groove 62 are formed to correspond to the second mountain portion 46. The second protruding portions 72 in the respective side surfaces 64 of the tree-shaped groove 62 are formed to correspond to the second valley portion 48. The third recessed portions 74 in the respective side surfaces 64 of the tree-shaped groove 62 are formed to correspond to the third mountain portion 50. The third protruding portions 76 in the respective side surfaces 64 of the tree-shaped groove 62 are formed to correspond to the third valley portion 52. Thus, the width between the first recessed portions 66 is made equal to the diameter d1 of the first mountain portion 42. The width between the first protruding portions 68 is made equal to the diameter d2 of the first valley portion 44. The width between the second recessed portions 70 is made equal to the diameter d3 of the second mountain portion 46. The width between the second protruding portions 72 is made equal to the diameter d4 of the second valley portion 48. The width between the third recessed portions 74 is made equal to the diameter d5 of the third mountain portion 50. The width between the third protruding portions 76 is made equal to the diameter d6 of the third valley portion 52. In an actual cutting operation, the above-described widths d1-d6 of the tree-shaped groove 62 are not necessarily precisely made equal to the respective diameters d1-d6 of the blade portion 34. However, the widths d1-d6 are made substantially equal to the respective diameters d1-d6, so that each of the widths d1-d6 is handled as a value that is practically same as a corresponding one of the diameters d1-d6 in descriptions of the present embodiment.

Figure 5:
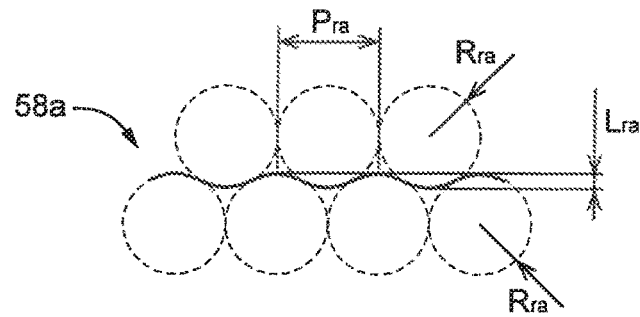
FIG. 5 is a view for explaining, in detail, construction of the roughing portion provided in the blade portion of the christmas-tree cutter shown in FIG. 1.
Figure 6:
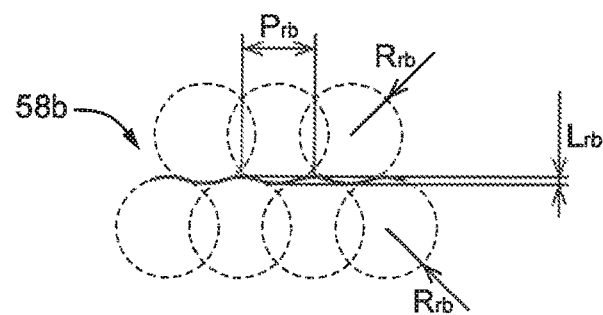
FIG. 6 is a view for explaining, in detail, construction of the fine roughing portion provided in the blade portion of the christmas-tree cutter shown in FIG. 1.
Figure 7:
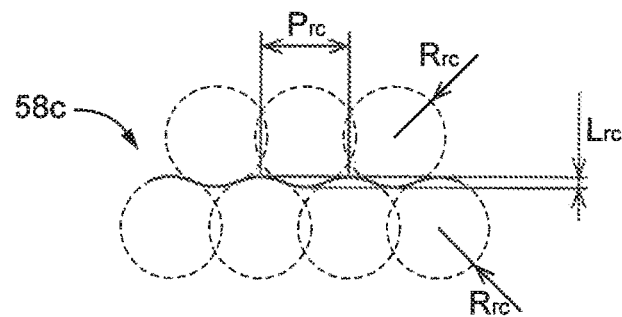
FIG. 7 is a view for explaining, in detail, construction of a roughing portion provided between the roughing portion shown in FIG. 5 and the fine roughing portion shown in FIG. 6.

As shown in FIG. 2, the blade portion 34 is provided with relieved portions 54 behind respective the peripheral cutting edges 38 such that a radial dimension of the blade portion 34 is reduced gradually from the cutting edge diameter (namely, a clearance amount is increased) in each of the relieved portions 54, as viewed in a circumferential direction about the axis C away from the corresponding peripheral cutting edge 38 In FIG. 1, portions surrounded by circles are shown in enlargement, for explaining constructions of relieved surfaces 56 corresponding to the respective peripheral cutting edges 38. The relieved surfaces 56 correspond to side circumferential surfaces of the respective relieved portions 54. The enlarged portions of FIG. 1 provide detailed explanation of construction of a boundary between each of the peripheral cutting edges 38 and a corresponding one of the relieved surfaces 56. As shown in the enlarged portions of FIG. 1, the christmas-tree cutter 30 of the present embodiment has roughing portions 58a, 58b (hereinafter simply referred to as "roughing portions 58" unless they are to be distinguished from each other), each of which is constituted by a successions of a plurality of smooth protrusions and recesses arranged in the direction of the axis C so as to form a corrugated shape. The roughing portions 58a, 58b are provided on the relieved surfaces 56 and boundaries between the peripheral cutting edges 38 and the relieved surfaces 56. That is, each of the peripheral cutting edges 38 is a roughing cutting edge with a corresponding one of the relieved surfaces 56 on which there are provided the above-described protrusions and recesses that cooperate to define the small corrugated shape. Each of the roughing portions 58 is formed to have the corrugated shape as seen in a plane containing the axis C, namely, have a shape in which protrusions and recesses each having a predetermined radius of curvature are repeated at a predetermined pitch, as shown in FIGS. 5-7 referred below. That is, the christmas-tree cutter 30 is a roughing christmas-tree cutter used to perform a rough cutting (rough finish cutting) or intermediate cutting (intermediate finish cutting) for the tree-shaped groove 62 as a groove to be cut. In the christmas-tree cutter 30, preferably, a phase of the corrugated shape defined by the succession of protrusions and recesses formed on the relieved surface 56 corresponding to one of each two of the peripheral cutting edges 38 is offset from that on the relieved surface 56 corresponding to the other of each two of the peripheral cutting edges 38. For example, the recesses (protrusions) formed on the relieved surface 56 corresponding to one of the two peripheral cutting edges 38 are located in the same positions as the protrusions (recesses) formed on the relieved surface 56 corresponding to the other of the two peripheral cutting edges 38.

As shown in FIG. 1, in the christmas-tree cutter 30, the roughing portions 58b are provided in the first valley portion 44 in which the cutting edge diameter of the peripheral cutting edges 38 is locally minimized, while the roughing portions 58a are provided in other portions other than the first valley portion 44, wherein the roughing portions 58b are different in characteristics from the roughing portions 58a. It is noted that the roughing portion 58a provided in the third mountain portion 50 is shown in FIG. 1. In other words, the roughing portions 58a of first form are provided in the other portions other than the first valley portion 44 while the roughing portions 58b of second form that are different in characteristics from the roughing portions 58a are provided in the first valley portion 44. In the present embodiment, the roughing portions 58b correspond to fine roughing portions provided in neck portions in which the cutting edge diameter of the peripheral cutting edges 38 is locally minimized. Preferably, among the first, second and third valley portions 44, 48, 52 corresponding to the respective neck portions in the blade portion 34, at least the first valley portion 44 as one of the neck portions in which the cutting edge diameter of the peripheral cutting edges 38 is globally minimized is provided with the roughing portions 58b as the fine roughing portions. For example, the roughing portions 58b as the fine roughing portions are provided in the first valley portion 44 while the roughing portions 58a are provided in the other portions which include the second and third valley portions 48, 52 and which are other than the first valley portion 44. Alternatively, the roughing portions 58b as the fine roughing portions are provided in the first, second and third valley portions 44, 48, 52 corresponding to the respective neck portions in the blade portion 34, while the roughing portions 58a are provided in other portions which are other than the first, second and third valley portions 44, 48, 52. Alternately, the roughing portions 58b as the fine roughing portions are provided in the first and second valley portions 44, 48 as two of the first, second and third valley portions 44, 48, 52 corresponding to the respective neck portions in the blade portion 34, while the roughing portions 58a are provided in other portions which include the third valley portion 52 and which are other than the first and second valley portions 44, 48. In the following description of the embodiment, there will be described a construction in which the first and second valley portions 44, 48 are provided with the roughing portions 58b as the fine roughing portions while the other portions other than the first and second valley portions 44, 48 are provided with the roughing portions 58a.

Figure 4:
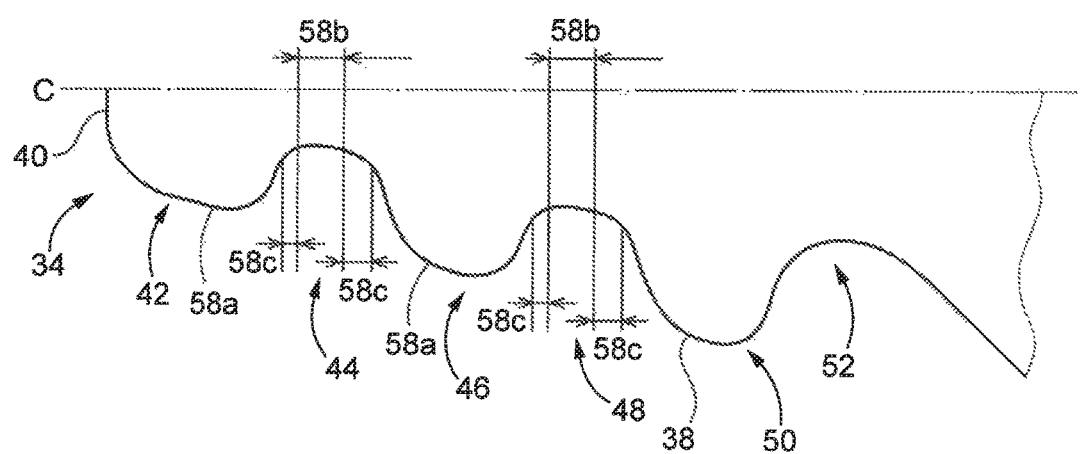
FIG. 4 is a view for explaining a roughing portion and a fine roughing portion provided in the blade portion of the christmas-tree cutter shown in FIG. 1.

FIGS. 4-7 are views for explaining of details of characteristics of the roughing portion 58a and the roughing portion 58b as the fine roughing portion, which are provided in the blade portion 34 of the christmas-tree cutter 30. In FIGS. 5-7, broken lines indicate circles defined by radii of curvature of the respective protrusions and recesses in the roughing portion 58. As described above, in the blade portion 34, the roughing portions 58b as the fine roughing portions are provided in the first and second valley portions 44, 46 while the roughing portions 58a are provided in the portions other than the first and second valley portions 44, 46. Preferably, as shown in FIG. 4, (in a R portion) between each of the roughing portions 58a and a corresponding one of the roughing portions 58b, there is provided a roughing portions 58c that has characteristics intermediate between those of the roughing portions 58a, 58b. As described below, the characteristics of the roughing portion 58c are between those of the roughing portions 58a, 58b in terms of, for example, pitch, depth and radius of curvature of the protrusions and recesses. For example, as shown in FIG. 4, each of the roughing portions 58b is provided in a predetermined region including a locally minimized portion of a corresponding one of the first and second valley portions 44, 46 in which the cutting edge diameter of the peripheral cutting edges 38 is locally minimized, wherein the predetermined range has a predetermined length in the axial direction. The roughing portion 58c is provided to be contiguous to each of opposite ends of each of the roughing portions 58b in the axial direction. In the other portions other than the first and second valley portions 44, 48, each of the roughing portions 58a is provided to be contiguous to a corresponding one of the roughing portions 58c. The roughing portions 58c are not essential so that the roughing portion 58a may be contiguous to each of opposite ends of each of the roughing portions 58b in the axial direction. FIGS. 5-7 show constructions of the roughing portion 58a, roughing portion 58b and roughing portion 58c, respectively, by ways of example. Hereinafter, with reference to these FIGS. 5-7, there will be described, in detail, differences in the characteristics of the roughing portions 58a, 58b, 58c.

Preferably, the roughing portions 58a, 58b, 58c are different in characteristics from one another in terms of the pitch $P_r$ of the protrusions and recesses. The pitch $P_r$ of the protrusions and recesses corresponds to a length of a unit pattern of the protrusions and recesses constituting each of the roughing portions 58, and is a so-called "roughing pitch". Specifically, as shown in FIGS. 5-7, where the roughing portion 58 is cut by a plane containing the axis C, an interval from a crest of one of the protrusions to a crest of another of the protrusions which is adjacent to the one of the protrusions (i.e., an interval from a bottom of one of the recesses to a bottom of another of the recesses which is adjacent to the one of the recesses) corresponds to the pitch $P_r$ of the protrusions and recesses in the roughing portion 58. That is, "$P_{ra}$" shown in FIG. 5 corresponds to the pitch of the protrusions and recesses in the roughing portion 58a. "$P_{rb}$" shown in FIG. 6 corresponds to the pitch of the protrusions and recesses in the roughing portion 58b. "$P_{rc}$" shown in FIG. 7 corresponds to the pitch of the protrusions and recesses in the roughing portion 58c. As shown in these FIGS. 5-7, preferably, the pitch $P_{rb}$ of the protrusions and recesses in the roughing portion 58b as the fine roughing portion is smaller than the pitch $P_{ra}$ of the protrusions and recesses in the roughing portion 58a ($P_{rb}<P_{ra}$). Preferably, the pitch $P_{rc}$ of the protrusions and recesses in the roughing portion 58c is smaller than the pitch $P_{ra}$ of the protrusions and recesses in the roughing portion 58a, and is larger than the pitch $P_{rb}$ of the protrusions and recesses in the roughing portion 58b ($P_{rb}<P_{rc}<P_{ra}$).

Preferably, the pitch $P_{ra}$ of the protrusions and recesses in the roughing portion 58a is within a range from 0.5 mm to 5.0 mm. The pitch $P_{rb}$ of the protrusions and recesses in the roughing portion 58b is within a range from 0.25 times to 0.75 times of the pitch $P_{ra}$ of the protrusions and recesses in the roughing portion 58a. That is, the pitch $P_{rb}$ of the protrusions and recesses in the roughing portion 58b is expressed, where the pitch of the protrusions and recesses in the roughing portion 58a is represented by "$P_{ra}$", by an expression (1) given below. According to an example of specific example, the pitch $P_{ra}$ of the protrusions and recesses in the roughing portion 58a is 2.0 mm, the pitch $P_{rb}$ of the protrusions and recesses in the roughing portion 58b is 1.0 mm, and the pitch $P_{rc}$ of the protrusions and recesses in the roughing portion 58c is 1.5 mm.

$$P_{ra}\times 0.25 \leq P_{rb} \leq P_{ra}\times 0.75 \quad (1)$$

Preferably, the roughing portions 58a, 58b, 58c are different in characteristics from one another in terms of the depth $L_r$ of the protrusions and recesses. The depth $L_r$ of the protrusions and recesses corresponds to an interval between the crest of the protrusion and the bottom of the recess in the roughing portions 58. Specifically, as shown in FIGS. 5-7, where the roughing portion 58 is cut by a plane containing the axis C, a distance between a line connecting the crests of the respective protrusions and a line connecting the bottoms of the respective recesses constituting the roughing portion 58 corresponds to the depth $L_r$ of the protrusions and recesses in the roughing portion 58. That is, "$L_{ra}$" shown in FIG. 5 corresponds to the depth of the protrusions and recesses in the roughing portion 58a. "$L_{rb}$" shown in FIG. 6 corresponds to the depth of the protrusions and recesses in the roughing portion 58b. "$L_{rc}$" shown in FIG. 7 corresponds to the depth of the protrusions and recesses in the roughing portion 58c. As shown in these FIGS. 5-7, preferably, the depth $L_{rb}$ of the protrusions and recesses in the roughing portion 58b as the fine roughing portion is smaller than the depth $L_{ra}$ of the protrusions and recesses in the roughing portion 58a ($L_{rb}<L_{ra}$). Preferably, the depth $L_{rc}$ of the protrusions and recesses in the roughing portion 58c is smaller than the depth $L_{ra}$ of the protrusions and recesses in the roughing portion 58a, and is larger than the depth $L_{rb}$ of the protrusions and recesses in the roughing portion 58b ($L_{rb}<L_{rc}<L_{ra}$).

Preferably, the depth $L_{ra}$ of the protrusions and recesses in the roughing portion 58a is within a range from 0.05 mm to 0.5 mm. The depth $L_{rb}$ of the protrusions and recesses in the roughing portion 58b is within a range from 0.25 times to 0.75 times of the depth $L_{ra}$ of the protrusions and recesses in the roughing portion 58a. That is, the depth $L_{rb}$ of the protrusions and recesses in the roughing portion 58b is expressed, where the depth of the protrusions and recesses in the roughing portion 58a is represented by "$L_{ra}$", by an expression (2) given below. According to an example of specific example, the depth $L_{ra}$ of the protrusions and recesses in the roughing portion 58a is 0.2 mm, the depth $L_{rb}$ of the protrusions and recesses in the roughing portion 58b is 0.1 mm, and the depth $L_{rc}$ of the protrusions and recesses in the roughing portion 58c is 0.15 mm.

$$L_{ra}\times 0.25 \leq L_{rb} \leq L_{ra}\times 0.75 \quad (2)$$

Preferably, the roughing portions 58a, 58b, 58c are different in characteristics from one another in terms of the curvature radius $R_r$ of the protrusions and recesses. The curvature radius $R_r$ of the protrusions and recesses corresponds to the radius of curvature of each of the protrusions and recesses in the roughing portions 58. Specifically, as shown in FIGS. 5-7, where the where the roughing portion 58 is cut by a plane containing the axis C, a radius of curvature in a predetermined region including the crest of the protrusion constituting the roughing portion 58 and a radius of curvature in a predetermined range including the bottom of the recess constituting the roughing portion 58 corresponds to the curvature radius $R_r$ of the protrusions and recesses in the roughing portion 58. Regarding the curvature radius $R_r$ of the protrusions and recesses in the roughing portion 58, although the curvature radius R1 of the recess and the curvature radius R2 of the protrusion may be different from each other, it is preferable that the curvature radius R1 of the recess and the curvature radius R2 of the protrusion are substantially equal to each other (R1=R2=$R_r$). That is, "$R_{ra}$" shown in FIG. 5 corresponds to the curvature radius of the protrusions and recesses in the roughing portion 58a. "$R_{rb}$" shown in FIG. 6 corresponds to the curvature radius of the protrusions and recesses in the roughing portion 58b. "$R_{rc}$" shown in FIG. 7 corresponds to the curvature radius of the protrusions and recesses in the roughing portion 58c. Preferably, the curvature radius $R_{rb}$ of the protrusions and recesses in the roughing portion 58b as the fine roughing portions is smaller than the curvature radius $R_{ra}$ of the protrusions and recesses in the roughing portion 58a ($R_{rb}<R_{ra}$). Preferably, the curvature radius $R_{rc}$ of the protrusions and recesses in the roughing portion 58c is smaller than the curvature radius $R_{ra}$ of the protrusions and recesses in the roughing portion 58a, and is larger than the curvature radius $R_{rb}$ of the protrusions and recesses in the roughing portion 58b ($R_{rb}<R_{rc}<R_{ra}$). Alternatively, the curvature radii $R_{ra}$, $R_{rb}$, $R_{rc}$ of the protrusions and recesses in the respective roughing portions 58a, 58b, 58c are equal to one another ($R_{ra}=R_{rb}=R_{rc}$).

Preferably, the curvature radius $R_{ra}$ of the protrusions and recesses in the roughing portion 58a is within a range from 0.3 mm to 1.5 mm. The curvature radius $R_{rb}$ of the protrusions and recesses in the roughing portion 58b is within a range from 0.3 times to 1 time of the curvature radius $R_{ra}$ of the protrusions and recesses in the roughing portion 58*a*. That is, the curvature radius $R_{rb}$ of the protrusions and recesses in the roughing portion 58*b* is expressed, where the curvature radius of the protrusions and recesses in the roughing portion 58*a* is represented by "$R_{ra}$", by an expression (3) given below. According to an example of specific example, the curvature radius $R_{ra}$ of the protrusions and recesses in the roughing portion 58*a* is 1 mm, the curvature radius $R_{rb}$ of the protrusions and recesses in the roughing portion 58*b* is 0.5 mm, and the curvature radius $R_{rc}$ of the protrusions and recesses in the roughing portion 58*c* is 0.75 mm.

$$R_{ra} \times 0.3 \leq R_{rb} \leq R_{ra} \quad (3)$$

Figure 8:
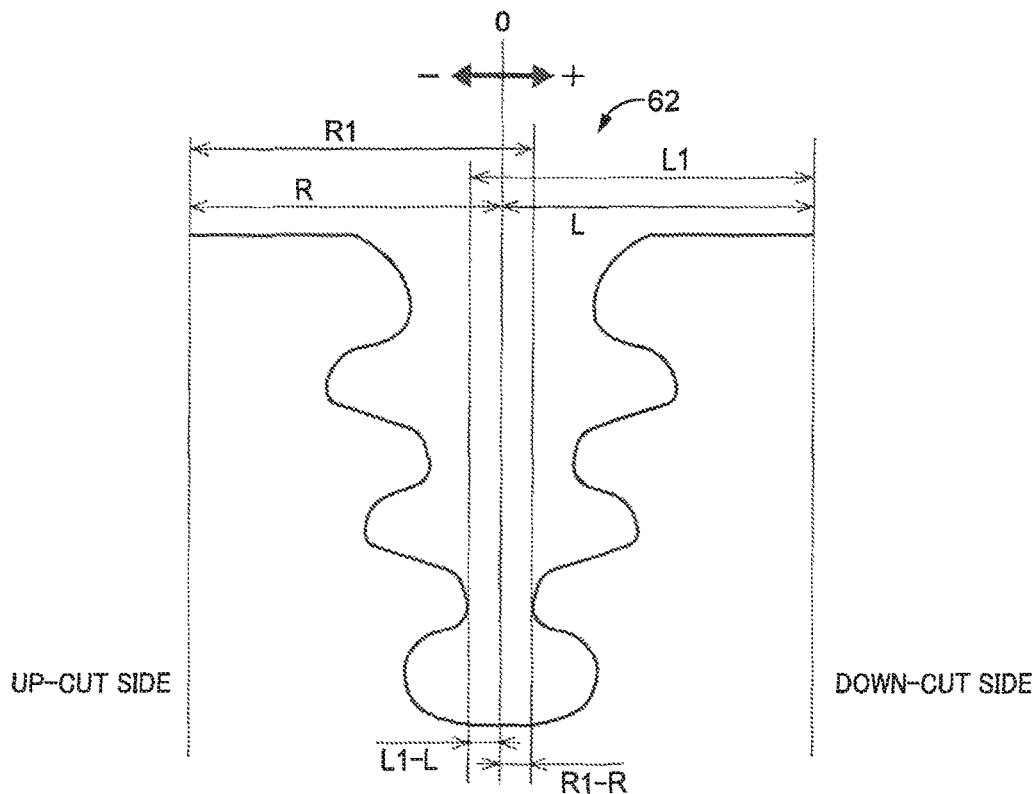
FIG. 8 is a view for explaining occurrence of inclination of the tree-shaped groove during cutting by the christmas-tree cutter.
Figure 9:
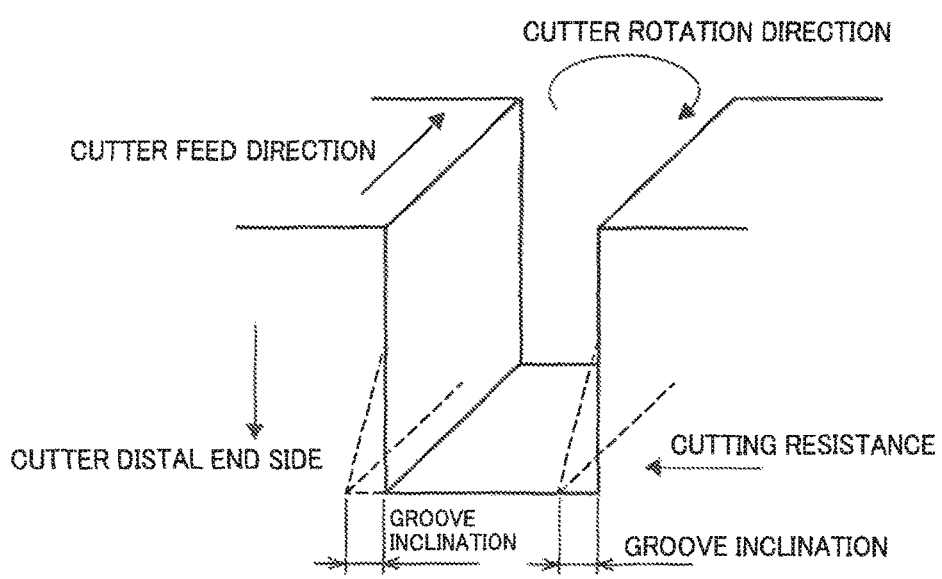
FIG. 9 is a view for explaining occurrence of inclination of the tree-shaped groove during cutting by the christmas-tree cutter.

FIGS. 8 and 9 are views for explaining an inclination of the tree-shaped groove 62, which could occur during the cutting operation performed by the christmas-tree cutter 30. In FIG. 9, the opposite side surfaces of the tree-shaped groove 62 is schematically illustrated as if they were flat surfaces, without increase and reduction of the width being shown. FIG. 8 is also a view for explaining a method of measuring the inclination of the groove, which will be described later. As shown in FIG. 8, during the cutting operation for cutting the tree-shaped groove 62 by the christmas-tree cutter 30, a down-cut and an up-cut are concurrently performed on respective right and left sides of the christmas-tree cutter 30 as seen in a feed direction of the cutter 30, as the cutter 30 is fed. In this cutting operation, there is a risk of occurrence of phenomenon in which the cut tree-shaped groove 62 could be inclined, namely, a bottom side portion of the groove 62 could be inclined toward the up-cut side. For example, as indicated by broken lines in FIG. 9, due to cutting resistances acting against the rotating direction and feed direction of the christmas-tree cutter 30, there is a risk of inclination of the bottom portion of the tree-shaped groove 62 (corresponding to the tool distal end side) toward the left side as seen in the feed direction of the christmas-tree cutter 30.

Figure 10:
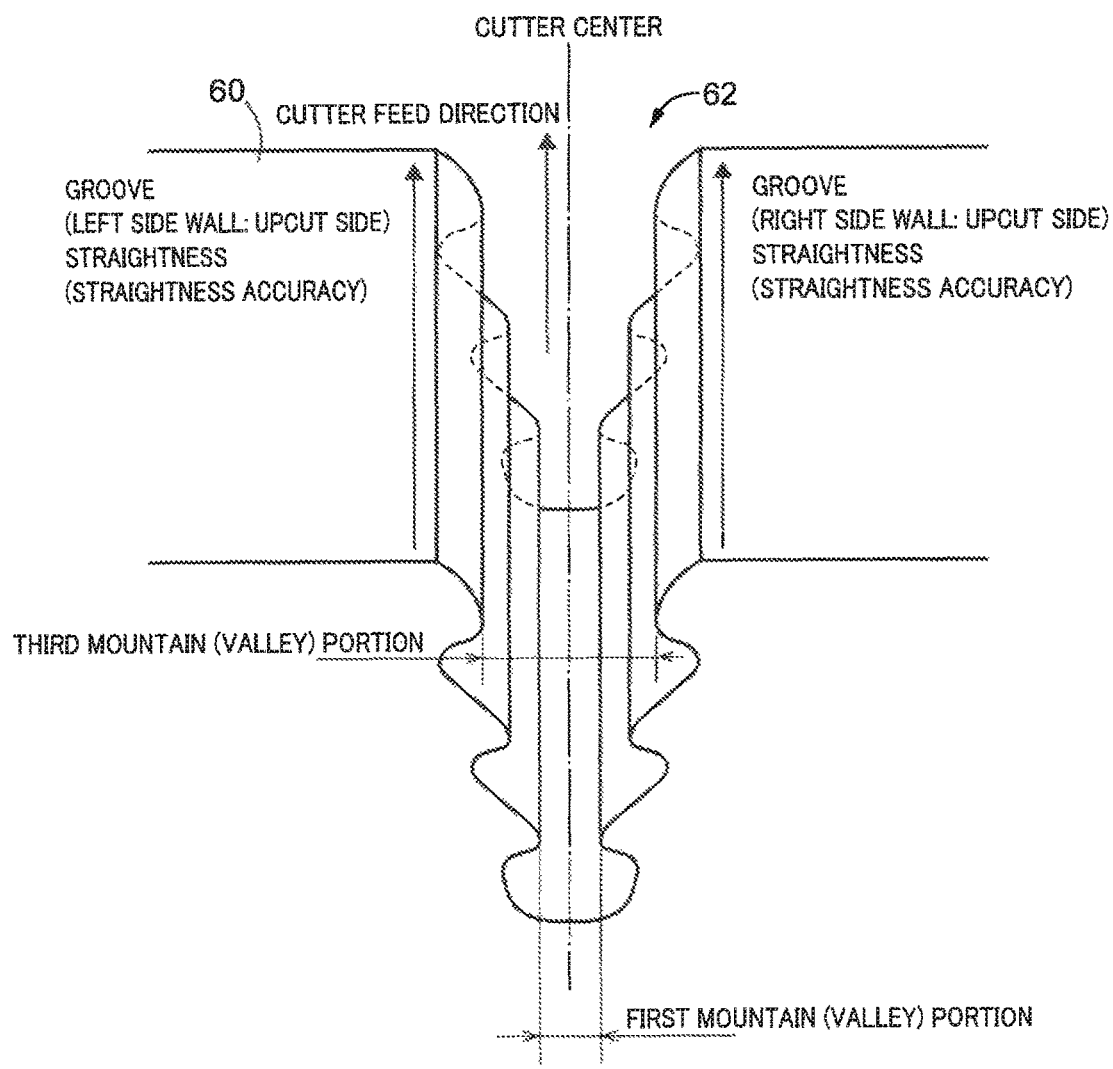
FIG. 10 is a perspective view for explaining straightness of the tree-shaped groove cut by the christmas-tree cutter of FIG. 1 and corresponding portions of the christmas-free cutter.

FIG. 10 is a perspective view for explaining a straightness of the tree-shaped groove 62 cut by the christmas-tree cutter 30 and corresponding portions of the christmas-tree cutter 30. The straightness of the tree-shaped groove 62 is a value indicating a deviation of each of the side surfaces 64*a*, 64*b* of the tree-shaped groove 62 from a line parallel to a locus of movement of the axis C (corresponding to the cutter center indicated by one-dot chain line in FIG. 10) of the christmas-tree cutter 30, for example, during cutting of the tree-shaped groove 62 by the christmas-tree cutter 30. When the tree-shaped groove 62 is inclined, the straightness of the tree-shaped groove 62 is reduced. Due to the inclination, the tree-shaped groove 62 is bent in an exit portion (an end portion through which the christmas-tree cutter 30 exits from the workpiece 60), so that the straightness of the tree-shaped groove 62 is reduced by the bending. In addition to the reduction of the straightness of the tree-shaped groove 62, the large inclination of the cut tree-shaped groove 62 could provide inconveniences such as a need of setting a relatively large finishing allowance to be removed by a finishing cut, an increase of risk of breakage of the christmas-tree cutter 30 due to the inclination and bending of the tree-shaped groove 62 and a need of requiring a relatively long cutting time by setting a cutting condition required for restraining the inclination and bending of the tree-shaped groove 62.

For verifying effects of the christmas-tree cutter 30 of the present embodiment, the present inventor conducted a cutting test under a cutting test condition described below. The inventor prepared a test tool (invention product) as an embodiment of the present invention and also a test tool (conventional product) as a prior art. In the test tool (invention product), the first valley portion 44 is provided with the roughing portions 58*b* as the fine roughing portions in which the pitch $P_{rb}$ of the protrusions and recesses is 1.0 mm while the other portions other than the first valley portion 44 are provided with the roughing portions 58*a* in which the pitch $P_{ra}$ of the protrusions and recesses is 2.0 mm. In the other test tool (conventional product), the blade portion 34 including the first valley portion 44 as the neck portion is provided at its outer periphery with the uniform roughing portions 58 in which the pitch $P_r$ of the protrusions and recesses is 2.0 mm. Each of the test tools used for the present test is a three-flute roughing christmas-tree cutter for forming the above-described tree-shaped groove 62 whose configuration is shown in FIG. 3. In the test, the tree-shaped grooves were cut under the cutting test condition described below by using the above-described invention product and conventional product, and evaluations were made in terms of cutting chip form, vibration, cutting noise, finished surface, machine load meter and tool damage in the groove cutting. The machine load meter corresponds to cutting load, and is a value that is increased with increase of the cutting load. Further, an evaluation was made in terms of inclination of the tree-shaped grooves cut by the invention product and the conventional product, by means of a measuring method described below. Moreover, an evaluation was made in terms of straightness as a value indicative of deviation (mm) in a direction of the width of the tree-shaped groove, from a groove (ideal groove) parallel to a feed direction of the tool, with a reference of a waypoint.

[Cutting Test Condition]

Test tools: roughing christmas-tree cutter for test (maximum diameter of approximately 50 mmφ, minimum diameters of approximately 16 mmφ (in the first valley portion) and approximately 36 mmφ (in the third valley portion))

Workpiece material: SNCN439 90HRB (JIS standard)

Cutting fluid: water-insoluble cutting fluid (JIS type 2 No. 5)

Machine: vertical machining center

Feed rate: approximately 10 mm/min.

Groove depth: approximately 70 mm

Cutting length: 100 mm

[Groove Inclination Measuring Method (see FIG. 8)]

1. Measuring coordinates L, R from the tool center (axis) to left and right reference surfaces.

2. Measuring coordinates L1, R1 of left and right machined grooves (widths) from the reference surfaces.

3. Calculating left and right groove widths L1-L, R1-R from the measured R, L, R1, L1.

4. Calculating ½ of a difference between the left groove width L1-L and the right groove width R1-R as the groove inclination (namely, groove inclination=(left groove width−right groove width)/2)

FIG. 11 is a view showing result of the cutting test. In FIG. 11, excellent result, good result and fair result are indicated by "EXCELLENT", "GOOD" and "FAIR", respectively, in terms of the cutting chip form, vibration, cutting noise, finished surface and tool damage. From the result of the test shown in FIG. 11, it is understood that the test tool (present invention product) as the embodiment of the present invention is excellent over the test tool (conventional product) as the prior art, in terms of any of the cutting chip form, vibration, cutting noise, finished surface and machine load meter (cutting load). It is understood that, in the test tool as the embodiment of the invention, the inclination and bending of the cut tree-shaped groove are restrained as compared with in the test tool as the prior art. That is, in cutting of the tree-shaped groove, there is a requirement that the groove inclination should be not larger than 0.30 mm (finishing allowance in each valley portion should be not larger than 0.30 mm). In the tree-shaped groove cut by the test tool as the embodiment of the invention, the inclination in the first protruding portion 68 cut by the first valley portion 44 was 0.15, and the inclination in the third protruding portion 76 cut by the third valley portion 52 was 0.09, so that both of them were within the range not larger than 0.30 mm. On the other hand, in the tree-shaped groove cut by the test tool as the prior art, the inclination in the first protruding portion 68 cut by the first valley portion 44 was 0.35, which is deviated from the range not larger than 0.30 mm. Further, in the cutting operation by the test tool as the embodiment of the invention, the tool was not damaged. However, in the cutting operation by the test tool as the prior art, chipping occurred in the first valley portion 44 as the neck portion. From the result of the test, it was confirmed that, as compared with the test tool as the prior art, the test tool as the embodiment of the invention is excellent in cutting performance and restrains the inclination and bending of the cut tree-shaped groove and the tool damage.

For verifying effects of the christmas-tree cutter 30 of the present embodiment, the present inventor further conducted a cutting test under a cutting test condition described below. The inventor prepared test tools (invention products 1-5) as embodiments of the present invention. In the test tools, the first valley portion 44 is provided with the roughing portions 58b as the fine roughing portions while the other portions other than the first valley portion 44 are provided with the roughing portions 58a in which the pitch $P_{ra}$ of the protrusions and recesses is 2.0 mm. The pitches $P_{rb}$ of the protrusions and recesses in the roughing portions 58b of the respective test tools (invention products 1-5) are 0.4 mm, 0.5 mm, 1.0 mm, 1.5 mm and 1.6 mm, respectively, as shown in FIG. 12. The inventor prepared also a test tool (conventional product) as a prior art. In the test tool (conventional product), the blade portion 34 including the first valley portion 44 as the neck portion is provided at its outer periphery with the uniform roughing portions 58 in which the pitch $P_r$ of the protrusions and recesses is 2.0 mm. Each of the test tools used for the present test is a three-flute roughing christmas-tree cutter for forming the above-described tree-shaped groove 62 whose configuration is shown in FIG. 3. In the test, the tree-shaped grooves were cut under the cutting test condition described below by using the above-described invention products 1-5 and conventional product, and evaluations were made in terms of cutting sharpness, vibration, cutting noise, finished surface, machine load meter and tool damage in the groove cutting. Further, evaluations were made in terms of inclination and straightness of the tree-shaped grooves cut by the invention products 1-5 and the conventional product, by means of the above-described measuring methods.

[Cutting Test Condition]

Test tools: roughing christmas-tree cutter for test (maximum diameter of approximately 50 mmφ, minimum diameter of approximately 10 mmφ)

Workpiece material: SNCN439 90HRB (JIS standard)
Cutting fluid: water-insoluble cutting fluid (JIS type 2 No. 5)
Machine: vertical machining center
Cutting speed: approximately 23 m/min
Feed rate: approximately 7 mm/min
Groove depth: approximately 70 mm FIG. 12 is a view showing result of the cutting test. In FIG. 12, excellent result, good result and fair result are indicated by "EXCELLENT", "GOOD" and "FAIR", respectively, in terms of the cutting sharpness, vibration, cutting noise, finished surface and tool damage. From the result of the test shown in FIG. 12, it is understood that the invention products 1-4 as the embodiments of the present invention are excellent over the test tool (conventional product) as the prior art, in terms of any of the sharpness, vibration, cutting noise, finished surface and machine load meter (cutting load). It is understood that, in the invention products 1-5 as the embodiments of the invention, the inclination and bending of the cut tree-shaped groove are restrained as compared with in the test tool as the prior art. Further, the tools were not damaged in the cutting operations by the invention products 1-4 as the embodiments of the invention, while chipping occurred in the first valley portion 44 as the neck portion in the cutting operation by the test tool as the prior art. In the invention product 5 as the embodiment of the invention, although small chipping occurred in the first valley portion 44 as the neck portion, the small chipping was a degree of damage which did not affect the performance of the tool. From the result of the test, it was confirmed that, as compared with the test tool as the prior art, the invention products 1-5 as the embodiments of the invention are excellent in cutting performance and restrain the inclination and bending of the cut tree-shaped groove and the tool damage.

In the present embodiment, at least the first valley portion 44 as the neck portion in which the cutting edge diameter of the peripheral cutting edge 38 is locally minimized is provided with the roughing portions 58b as the fine roughing portions that are different in characteristics from the roughing portions 58a provided in the portion or portions other than the above-described at least the first valley portion 44. For example, where the roughing portions 58b provided in the above-described at least the first valley portion 44 have characteristics that make cutting chips small, it is possible to restrain clogging of the cutting chips in the above-described at least the first valley portion 44 and accordingly to advantageously restrain occurrence of breakage. That is, it is possible to provide the christmas-tree cutter 30 as the formed rotary cutting tool capable of restraining occurrence of the breakage.

In the present embodiment in which the roughing portions 58b as the fine roughing portions are provided in the above described at least the first valley portion 44, a sectional area of the above-described at least the first valley portion 44 is larger than in an arrangement in which the roughing portions 58a are provided in the above-described at least the first valley portion 44, so that the rigidity of the tool is improved. Since the occurrence of inclination of the tree-shaped groove 62 can be effectively restrained, it is possible to obtain various advantageous effects such as restraint of the occurrence of bending of the tree-shaped groove 62 upon exit of the cutter 30 from the workpiece 60, reduction of the finishing allowance to be removed by the finishing cut of the tree-shaped groove 62, reduction of risk of the tool breakage and reduction of time required for the cutting operation. Moreover, as compared with in the prior art, since the state of cutting of the tree-shaped groove 62 is more stabilized, the risk of trouble occurrence is made smaller thereby providing an advantage making it possible to perform unmanned machining by industrial robots or the like.

Figure 13:
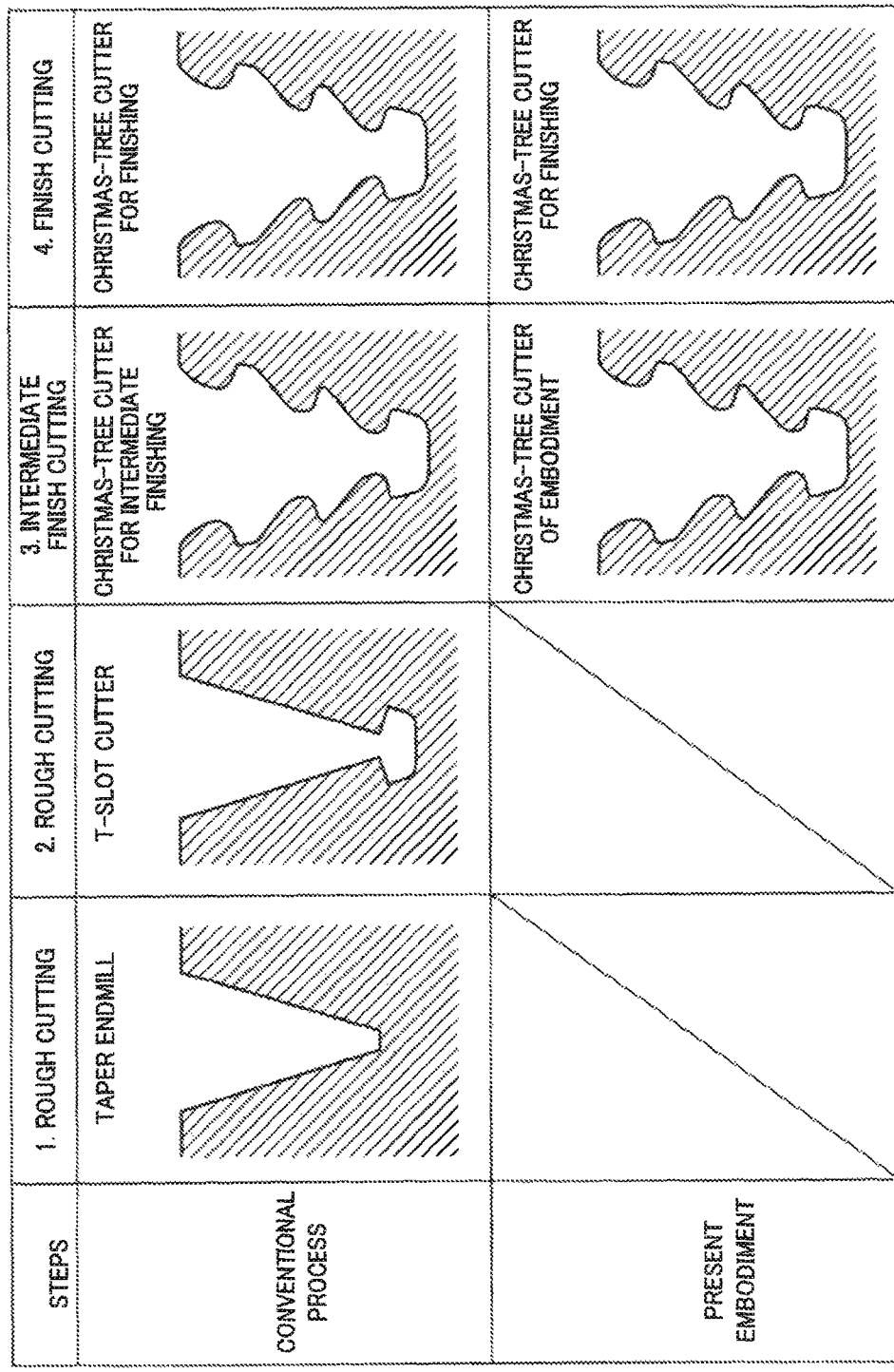
FIG. 13 is a view for explaining that a number of steps can be made smaller than in the prior art, by cutting the tree-shaped groove with use of the christmas-tree cutter of the invention.

In the present embodiment, as compared with in the prior art, the number of steps required for cutting a groove can be made smaller. In the conventional process, a first rough-cutting step by a taper endmill and a second rough-cutting step by a T-slot cutter were required to be implemented prior to implementations of an intermediate finish cutting step by a christmas-tree cutter for intermediate finishing work and a finish cutting step by a christmas-tree cutter for finishing work, as shown in FIG. 13. The christmas-tree cutter 30 of the present embodiment eliminates need to implement the first rough-cutting step and the second rough-cutting step, as shown in FIG. 13. That is, a groove having excellent characteristics can be obtained by implementing an intermediate finish cutting step by the christmas-tree cutter 30 and a finish cutting step by a christmas-tree cutter for finishing work, so that the number of steps can be reduced without having to implement steps corresponding to the first and second rough-cutting steps that were implemented in the prior art.

The roughing portion 58b provided in at least the first valley portion 44 is smaller than the roughing portion 58a provided in the portion or portions other than the above-described at least the first valley portion 44, in terms of the pitch $P_r$ of the protrusions and recesses. This arrangement makes it possible to restrain clogging of the cutting chips in the above-described at least the first valley portion 44 and accordingly to advantageously restrain occurrence of breakage, where the roughing portion 58b provided in the above-described at least the first valley portion 44 has characteristics that make cutting chips smaller than in the other portion or portions.

The pitch $P_{ra}$ of the protrusions and recesses in the roughing portion 58a provided in the portion or portions other than the above-described at least the first valley portion 44 is in a range between 0.5 mm and 5.0 mm, and the pitch $P_{rb}$ of the protrusions and recesses in the roughing portion 58b provided in the above-described at least the first valley portion 44 is in a range between 0.25 times and 0.75 times of the pitch $P_{ra}$ of the protrusions and recesses in the roughing portion 58a provided in the portion or portions other than the above-described at least the first valley portion 44. This arrangement makes it possible to restrain clogging of the cutting chips in the above-described at least the first valley portion 44 and accordingly to advantageously restrain occurrence of breakage, where the roughing portion 58b provided in the above-described at least the first valley portion 44 has a practical construction that makes the cutting chips smaller than in the portion or portions other than the above-described at least the first valley portion 44.

The roughing portion 58b provided in the above-described at least the first valley portion 44 is smaller than the roughing portion 58a provided in the portion or portions other than the above-described at least the first valley portion 44, in terms of the depth $L_r$ of the protrusions and recesses. This arrangement makes it possible to restrain clogging of the cutting chips in the above-described at least the first valley portion 44 and accordingly to advantageously restrain occurrence of breakage, where the roughing portion 58b provided in the above-described at least the first valley portion 44 has characteristics that make the cutting chips smaller than in the portion or portions other than the above-described at least the first valley portion 44.

The roughing portion 58b provided in the above-described at least the first valley portion 44 is smaller than the roughing portion 58a provided in the portion or portions other than the above-described at least the first valley portion 44, in terms of the radius $R_r$ of curvature of the protrusions and recesses. This arrangement makes it possible to restrain clogging of the cutting chips in the above-described at least the first valley portion 44 and accordingly to advantageously restrain occurrence of breakage, where the roughing portion 58b provided in the above-described at least the first valley portion 44 has characteristics that make the cutting chips smaller than in the portion or portions other than the above-described at least the first valley portion 44.

The first valley portion 44 in which the cutting edge diameter of the peripheral cutting edges 38 is globally minimized is provided with the roughing portion 58b as the fine roughing portion that is different in characteristics from the roughing portion 58a provided in the portion or portions other than the first valley portion 44. This arrangement makes it possible to restrain clogging of the cutting chips in the first valley portion 44 in which the cutting edge diameter is globally minimized whereby the breakage is likely to occur the most, and accordingly to advantageously restrain occurrence of breakage in the first valley portion 44.

The roughing portion 58c that is different in characteristics from the roughing portion 58a and the roughing portion 58b is provided between the above-described at least the first valley portion 44 and the roughing portion 58a that is different in characteristics from the roughing portion 58b. This arrangement makes it possible to further advantageously restrain clogging of the cutting chips in the above-described at least the first valley portion 44, where the roughing portion 58c provided between the roughing portion 58b provided in the above-described at least the first valley portion 44 and the above-described roughing portion 58a provided in the portion or portions other than the above-described at least the first valley portion 44 has characteristics intermediate therebetween.

While the embodiment of the present invention has been described in detail by reference to the accompanying drawings, it is to be understood that the present invention may be otherwise embodied.

For example, in the above-described embodiment, there has been described, as an example of the formed rotary cutting tool of the invention, the christmas-tree cutter 30 having the three peripheral cutting edges 38 disposed about the axis C. However, the invention is not limited to the details, and may be advantageously applied also to a christmas-tree cutter having two or less peripheral cutting edges 38 disposed about the axis C and a christmas-tree cutter having four or more peripheral cutting edges 38 disposed about the axis C.

In the above-described embodiment, there has been described, as an example of the formed rotary cutting tool of the invention, the christmas-tree cutter 30 having the three mountain portions arranged in the direction of the axis C. However, the invention may be advantageously applied also to a four-mountain christmas-tree cutter having four mountain portions arranged in the direction of the axis C and a christmas-tree cutter having five or more mountain portions arranged in the direction of the axis C. Further, the invention may be advantageously applied also to a two-mountain christmas-tree cutter having two mountain portions arranged in the direction of the axis C and a one-mountain christmas-tree cutter having one mountain portion.

In the above-described embodiment, there has been described an example in which the invention is applied to the christmas-tree cutter 30 as the example of the formed rotary cutting tool. The invention is not limited to the christmas-tree cutter, and may be widely applied to any formed rotary cutting tool including a neck portion in which the cutting edge diameter of the cutting edge is locally minimized.

The invention may be embodied with various modifications within a range not departing from the spirit of the invention, although each of the modifications is not particularly described by way of example.

DESCRIPTION OF REFERENCE SIGNS

30: christmas-tree cutter (formed rotary cutting tool), 38: peripheral cutting edge, 44: first valley portion (neck portion), 48: second valley portion (neck portion), 52: third valley portion (neck portion), 58a: roughing portion, 58b: roughing portion (fine roughing portion), 60: workpiece, 62: tree-shaped groove (cut groove), C: axis

The invention claimed is:

1. A formed rotary cutting tool that is to be moved relative to a workpiece in a direction perpendicular to an axis of the cutting tool while being rotated about the axis, so as to cut a groove having a predetermined shape, in the workpiece, the formed rotary cutting tool comprising:
   a cutting edge defining a cutting edge diameter that increases and decreases in a direction of the axis, so as to have at least one neck portion in which the cutting edge diameter is minimized; and
   a roughing portion provided on a periphery of the formed rotary cutting tool, the rough portion being constituted by a succession of protrusions and recesses arranged in the direction of the axis, the roughing portion including: (i) a fine roughing portion provided in at least one of the at least one neck portion, and (ii) a second portion that is provided in a portion that is other than the neck portion in which the fine roughing portion is provided, the fine roughing portion of the roughing portion being different in characteristics from the second portion of the roughing portion, such that the fine roughing portion of the roughing portion is smaller than the second portion of the roughing portion by at least one of: a pitch of the protrusions and the recesses, a depth of the protrusions and the recesses, and a radius of curvature of the protrusions and the recesses.

2. The formed rotary cutting tool according to claim 1, wherein:
   the pitch of the protrusions and the recesses in the second portion of the roughing portion is in a range between 0.5 mm and 5.0 mm, and
   the pitch of the protrusions and the recesses in the fine roughing portion of the roughing portion is in a range between 0.25 times and 0.75 times as large as the pitch of the protrusions and the recesses in the second portion of the roughing portion.

3. The formed rotary cutting tool according to claim 1, wherein:
   the at least one neck portion includes a plurality of neck portions, and
   the fine roughing portion of the roughing portion is provided in one of the plurality of neck portions in which the cutting edge diameter is smaller than in any other of the plurality of neck portions.

4. The formed rotary cutting tool according to claim 1, wherein:
   the roughing portion includes, in addition to the fine roughing portion as a first roughing portion and the second portion as a second roughing portion, a third roughing portion that is provided between the first roughing portion and the second roughing portion,
   the third roughing portion is different in characteristics from the first roughing portion and the second roughing portion, such that (i) the third roughing portion is larger than the first roughing portion by the pitch of the protrusions and the recesses, the depth of the protrusions and the recesses, and the radius of curvature of the protrusions and the recesses, and (ii) the third roughing portion is smaller than the second roughing portion by the pitch of the protrusions and the recesses, the depth of the protrusions and the recesses, and the radius of curvature of the protrusions and the recesses.

* * * * *